(12) United States Patent
Hornung et al.

(10) Patent No.: US 11,860,265 B2
(45) Date of Patent: Jan. 2, 2024

(54) METHOD AND DEVICE FOR EXTRACTING SPATIAL/VELOCITY RESOLUTION OF A SINGLE-INPUT SINGLE-OUTPUT RADAR

(71) Applicant: Stichting IMEC Nederland, Eindhoven (NL)

(72) Inventors: Rainer Oliver Hornung, Eindhoven (NL); Peng Zhang, Veldhoven (NL); Marco Mercuri, Eindhoven (NL); Paul Mateman, Milingen a/d Rijn (NL); Lichen Yao, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 49 days.

(21) Appl. No.: 17/386,843

(22) Filed: Jul. 28, 2021

(65) Prior Publication Data
US 2022/0050193 A1 Feb. 17, 2022

(30) Foreign Application Priority Data
Aug. 13, 2020 (EP) .................................... 20190817

(51) Int. Cl.
*G01S 13/42* (2006.01)
*G01S 7/35* (2006.01)
*G01S 13/58* (2006.01)

(52) U.S. Cl.
CPC ............ *G01S 13/426* (2013.01); *G01S 7/354* (2013.01); *G01S 7/356* (2021.05); *G01S 13/584* (2013.01)

(58) Field of Classification Search
CPC ........ G01S 13/426; G01S 7/356; G01S 7/354; G01S 13/584

USPC .......................................................... 342/196
See application file for complete search history.

(56) References Cited

U.S. PATENT DOCUMENTS

| | | | | |
|---|---|---|---|---|
| 3,434,139 A | * | 3/1969 | Algeo | H01Q 25/02 343/768 |
| 5,103,233 A | * | 4/1992 | Gallagher | G01S 13/426 342/158 |
| 5,115,243 A | * | 5/1992 | Perry | G01S 13/87 342/158 |
| 5,115,244 A | * | 5/1992 | Freedman | G01S 13/44 342/158 |

(Continued)

FOREIGN PATENT DOCUMENTS

| | | | |
|---|---|---|---|
| WO | 2020006533 A1 | 1/2020 | |
| WO | WO-2020006533 A1 * | 1/2020 | ............. G01S 13/42 |

OTHER PUBLICATIONS

Extended European Search Report and Written Opinion, Application No. EP20190817.5, dated Jan. 25, 2021, 8 pages.

(Continued)

*Primary Examiner* — Nuzhat Pervin
(74) *Attorney, Agent, or Firm* — McDonnell Boehnen Hulbert & Berghoff LLP

(57) ABSTRACT

A method for extracting spatial resolution and/or velocity resolution of a single-input single-output radar acquiring raw radar data with a frequency scanning antenna is provided. The method includes steering a radar beam with the aid of the frequency scanning antenna with respect to an area to be illuminated by the radar, and dividing the area into at least two angular sectors. In this context, the at least two angular sectors are configured in a manner that the at least two angular sectors overlap with respect to each other.

18 Claims, 12 Drawing Sheets

(56) References Cited

U.S. PATENT DOCUMENTS

| | | | | |
|---|---|---|---|---|
| 5,173,706 | A * | 12/1992 | Urkowitz | G01S 7/032 342/39 |
| 7,196,653 | B2 * | 3/2007 | Hall | G01S 13/9056 342/75 |
| 7,408,453 | B1 * | 8/2008 | Breed | B60C 23/041 340/447 |
| 7,466,261 | B1 * | 12/2008 | Hoctor | G01S 13/12 342/134 |
| 7,672,756 | B2 * | 3/2010 | Breed | G07C 5/008 701/1 |
| 7,760,080 | B2 * | 7/2010 | Breed | B60C 23/0433 340/447 |
| 8,134,492 | B1 * | 3/2012 | Friesel | G01S 13/426 342/147 |
| 8,223,065 | B1 * | 7/2012 | Friesel | G01S 13/426 342/205 |
| 8,229,624 | B2 * | 7/2012 | Breed | B60R 21/0132 701/36 |
| 8,482,399 | B2 * | 7/2013 | Breed | G08B 25/009 340/517 |
| 8,786,437 | B2 * | 7/2014 | Breed | G01P 15/02 340/568.1 |
| 9,082,103 | B2 * | 7/2015 | Breed | G06V 20/52 |
| 9,211,811 | B2 * | 12/2015 | Breed | B60N 2/2863 |
| 9,239,379 | B2 * | 1/2016 | Burgio | G01S 7/354 |
| 9,593,521 | B2 * | 3/2017 | Breed | B60R 16/037 |
| 9,933,520 | B1 * | 4/2018 | Campbell | G01S 13/42 |
| 10,126,418 | B1 * | 11/2018 | Campbell | G01S 13/931 |
| 10,240,935 | B2 * | 3/2019 | Breed | G01C 21/3667 |
| 10,605,911 | B1 * | 3/2020 | Parker | G01S 13/42 |
| 2003/0112173 | A1 * | 6/2003 | Seki | G01S 13/584 342/107 |
| 2005/0104763 | A1 * | 5/2005 | Hall | G01S 13/9056 342/25 A |
| 2005/0243301 | A1 * | 11/2005 | Takagi | B60W 40/02 356/139.1 |
| 2014/0327566 | A1 * | 11/2014 | Burgio | G01S 13/343 342/108 |
| 2016/0018511 | A1 * | 1/2016 | Nayyar | G01S 7/03 342/27 |
| 2017/0248688 | A1 * | 8/2017 | Campbell | G01S 7/4026 |
| 2019/0204435 | A1 * | 7/2019 | Poiger | G01S 13/878 |
| 2019/0277964 | A1 * | 9/2019 | Badin | G01S 7/412 |
| 2019/0331768 | A1 * | 10/2019 | Harrison | G06F 18/217 |
| 2020/0011968 | A1 * | 1/2020 | Hammes | G01S 13/003 |
| 2020/0198674 | A1 * | 6/2020 | Arieli | B61L 23/041 |
| 2020/0309942 | A1 * | 10/2020 | Kunz | G01S 13/931 |
| 2021/0208269 | A1 * | 7/2021 | Carroll | G01S 13/4427 |
| 2021/0405182 | A1 * | 12/2021 | Reynolds | G01S 13/887 |

OTHER PUBLICATIONS

Geibig, Thomas, Alex Shoykhetbrod, Alexander Hommes, Reinhold Herschel, and Nils Pohl. "Compact 3D imaging radar based on FMCW driven frequency-scanning antennas." In 2016 IEEE Radar Conference (RadarConf), pp. 1-5. IEEE, 2016.

Orth, Alexander, Patrick Kwiatkowski, and Nils Pohl. "A novel approach for a mimo fmcw radar system with frequency steered antennas for 3d target localization." In 2019 16th European Radar Conference (EuRAD), pp. 37-40. IEEE, 2019.

Hommes, Alexander, Alex Shoykhetbrod, and Nils Pohl. "A fast tracking 60 GHz Radar using a frequency scanning antenna." In 2014 39th International Conference on Infrared, Millimeter, and Terahertz waves (IRMMW-THz), pp. 1-2. IEEE, 2014.

Alvarez-Lopez, Yuri, Cebrian Garcia-Gonzalez, Carlos Vazquez-Antuna, Samuel Ver-Hoeye, and Fernando Las Heras Andres. "Frequency scanning based radar system." Progress In Electromagnetics Research 132 (2012): 275-296.

Shoykhetbrod, Alex, Thomas Geibig, Alexander Hommes, Reinhold Herschel, and Nils Pohl. "Concept for a fast tracking 60 GHz 3D-radar using frequency scanning antennas." In 2016 41st International Conference on Infrared, Millimeter, and Terahertz waves (IRMMW-THz), pp. 1-3. IEEE, 2016.

* cited by examiner

METHOD AND DEVICE FOR EXTRACTING SPATIAL/VELOCITY RESOLUTION OF A SINGLE-INPUT SINGLE-OUTPUT RADAR

CROSS-REFERENCE TO RELATED APPLICATIONS

The present application is a non-provisional patent application claiming priority to European Patent Application No. 20190817.5, filed on Aug. 13, 2020, the contents of which are hereby incorporated by reference.

FIELD OF THE DISCLOSURE

The disclosure relates to a method for extracting spatial resolution and/or velocity resolution of a single-input single-output radar acquiring raw radar data with a frequency scanning antenna (FSA) and a device for extracting spatial resolution and/or velocity resolution of a single-input single-output radar acquiring raw radar data with a frequency scanning antenna.

BACKGROUND

Generally, in times of an increasing number of applications employing radar, there is a growing need of a method and a device for extracting spatial resolution and/or velocity resolution of a single-input single-output (SISO) radar acquiring raw radar data with a frequency scanning antenna in order to provide range, angle, and Doppler information (e.g., in an efficient and accurate manner), thereby potentially lowering costs power consumption.

The document Y. Álvarez Lopez et al.: "Frequency scanning based radar system", Progress in Electromagnetics Research, January 2012, Vol. 132, pp. 275-296 relates to an imaging technique based on a frequency scanning antenna array. In this context, angular information in range-based radar system is provided. Furthermore, the corresponding method contains an exact and non-overlapping subdivision of the frequency scanning bandwidth in frequency windows, each one having associated an angular region of the reconstruction domain. Disadvantageously, due to the segmentation of the complete angular observation area, the angular resolution and range resolution can be coarse. Further disadvantageously, in accordance with the imaging technique, a Doppler generation or a velocity generation is generally not possible.

SUMMARY

Accordingly, the disclosure includes a method for extracting spatial resolution and/or velocity resolution of a SISO radar acquiring raw radar data with a frequency scanning antenna and a device for extracting spatial resolution and/or velocity resolution of a SISO radar acquiring raw radar data with a frequency scanning antenna, which provide range, angle, and Doppler information.

According to a first aspect of the disclosure, a method for extracting spatial resolution and/or velocity resolution of a SISO radar acquiring raw radar data with a frequency scanning antenna is provided. The method comprises the steps of steering a radar beam with the aid of the frequency scanning antenna with respect to an area to be illuminated by the radar, and dividing the area into at least two angular sectors. In this context, the at least two angular sectors are configured in a manner that the at least two angular sectors overlap each other. Range, angle, and Doppler information can be provided. It is noted that the frequency scanning antenna may comprise or be a frequency scanning array or a frequency scanning antenna array. The frequency scanning array or frequency scanning antenna array may also be called frequency-scan array or frequency-scan antenna array.

According to a first implementation of the first aspect of the disclosure, for steering the radar beam with the aid of the frequency scanning antenna, the method comprises the step of varying the respective excitation frequency. For instance, beam steering can be achieved without active components such as tunable delays or phase shifters. In this context, it is noted that the beam steering may be performed with the aid of at least one fixed delay line.

Further, it is noted that the frequency scanning antenna may comprise an array of antenna elements. In this context, the respective phase shifting may be provided by the corresponding transmission line, for example by the at least one fixed delay line, which may be configured to connect the respective elements. Accordingly, the beam steering may be frequency dependent.

According to a second implementation form of the first aspect of the disclosure, the method comprises the step of generating a raw data slice comprising the raw radar data on the basis of the at least two angular sectors. Complexity can be reduced, which can lead to an increased efficiency.

According to a further implementation form of the first aspect of the disclosure, the raw data slice comprises or is a two-dimensional matrix. Additionally, or alternatively, the raw data slice represents a respective coherent processing interval. In further addition to this or as a further alternative, the raw data slice comprises or is a slow-time and fast-time matrix. In this way simplicity can be increased, thereby potentially reducing inefficiencies.

According to a further implementation form of the first aspect of the disclosure, the method comprises the step of generating a raw data cube on the basis of the raw data slice for example by copying the raw data slice at least once and stacking the raw data slice and the at least one copy thereof together in order to form the raw data cube. The raw data cube can facilitate compatibility with other methods or systems.

According to a further implementation form of the first aspect of the disclosure, the method comprises the step of generating a radar data cube on the basis of the raw data slice or the raw data cube for example by applying at least one window function and/or at least one frequency transform, for example at least one Fast Fourier Transform, to the raw data slice or the raw data cube.

According to a further implementation form of the first aspect of the disclosure, the method comprises the step of applying at least one angular window function to at least one, or each, of the at least two angular sectors such that the corresponding angular window function matching the respective angle of arrival of a corresponding radar target yields the strongest respective magnitude in the raw radar data. With the aid of the at least one angular window, a mapping between the position of the highest magnitude in raw data and the at least two angular sectors in physical space can be realized in a potentially efficient and accurate manner.

According to a further implementation form of the first aspect of the disclosure, the method comprises the step of deriving the at least one angular window function from the corresponding radiation pattern of the frequency scanning antenna. For instance, the radiation pattern can be retrieved on the basis of the corresponding mid-angles of each of the at least two angular sectors.

Further, the respective mid-angle(s) of at least one, for example each, of the at least two angular sectors may determine the corresponding beam directions. Additionally or alternatively, the respective mid-angle(s) of at least one, for example each, of the at least two angular sectors may determine the corresponding excitation frequencies of the frequency scanning antenna. Furthermore, based on these frequencies, the respective appropriate radiation pattern may be calculated with the aid of a radio frequency simulation unit.

According to a second aspect of the disclosure, a device for extracting spatial resolution and/or velocity resolution of a SISO radar acquiring raw radar data with a frequency scanning antenna is provided. The device comprises an interface being connectable to the SISO radar with the frequency scanning antenna, and a control unit connected to the interface. In this context, the control unit is configured to steer a radar beam with the aid of the frequency scanning antenna with respect to an area to be illuminated by the radar, wherein the control unit is configured to divide the area into at least two angular sectors. In addition to this, the at least two angular sectors are configured in a manner that the at least two angular sectors overlap each other. Range, angle, and Doppler information can be provided in an efficient and accurate manner. Further, low costs and low power consumption can potentially be provided.

According to a first implementation form of the second aspect of the disclosure, for steering the radar beam with the aid of the frequency scanning antenna, the control unit is configured to vary the excitation frequency. For instance, beam steering can be achieved without active components such as tunable delays or phase shifters. In this context, it is noted that the beam steering may be performed with the aid of at least one fixed delay line.

It is noted that the frequency scanning antenna may comprise an array of antenna elements. In this context, the respective phase shifting may be provided by the corresponding transmission line, for example by the at least one fixed delay line, which may be configured to connect the respective elements. Accordingly, the beam steering may be frequency dependent.

According to a second implementation form of the second aspect of the disclosure, the control unit is configured to generate a raw data slice comprising the raw radar data on the basis of the at least two angular sectors. In this way, complexity can be reduced, which can lead to an increased efficiency.

According to a further implementation form of the second aspect of the disclosure, the raw data slice comprises or is a two-dimensional matrix. Additionally, or alternatively, the raw data slice represents a respective coherent processing interval. In further addition to this or as a further alternative, the raw data slice comprises or is a slow-time and fast-time matrix. In this way, simplicity can be increased, thereby reducing inefficiencies.

According to a further implementation form of the second aspect of the disclosure, the control unit is configured to generate a raw data cube on the basis of the raw data slice for example by copying the raw data slice at least once and stacking the raw data slice and the at least one copy thereof together in order to form the raw data cube. In this way, the raw data cube can ensure or facilitate compatibility with other methods or systems.

According to a further implementation form of the second aspect of the disclosure, the control unit is configured to generate a radar data cube on the basis of the raw data slice or the raw data cube for example by applying at least one window function and/or at least one frequency transform, for example at least one Fast Fourier Transform, to the raw data slice or the raw data cube. In this way, accuracy can be increased in an efficient manner.

According to a further implementation form of the second aspect of the disclosure, the control unit is configured to apply at least one angular window function to at least one, for example each, of the at least two angular sectors such that the corresponding angular window function matching the respective angle of arrival of a corresponding radar target yields the strongest respective magnitude in the raw radar data. In this way, with the aid of the at least one angular window, a mapping between the position of the highest magnitude in raw data and the at least two angular sectors in physical space can be realized in an efficient and accurate manner.

According to a further implementation form of the second aspect of the disclosure, the control unit is configured to derive the at least one angular window function from the corresponding radiation pattern of the frequency scanning antenna, for instance, the radiation pattern can efficiently be retrieved on the basis of the corresponding mid-angles of each of the at least two angular sectors.

The respective mid-angle(s) of at least one, for example each, of the at least two angular sectors may determine the corresponding beam directions. Additionally or alternatively, the respective mid-angle(s) of at least one, for example each, of the at least two angular sectors may determine the corresponding excitation frequencies of the frequency scanning antenna. Furthermore, based on these frequencies, the appropriate radiation pattern may be calculated with the aid of a radio frequency simulation unit.

BRIEF DESCRIPTION OF THE FIGURES

The above, as well as additional, features will be better understood through the following illustrative and non-limiting detailed description of example embodiments, with reference to the appended drawings.

Figure 1:
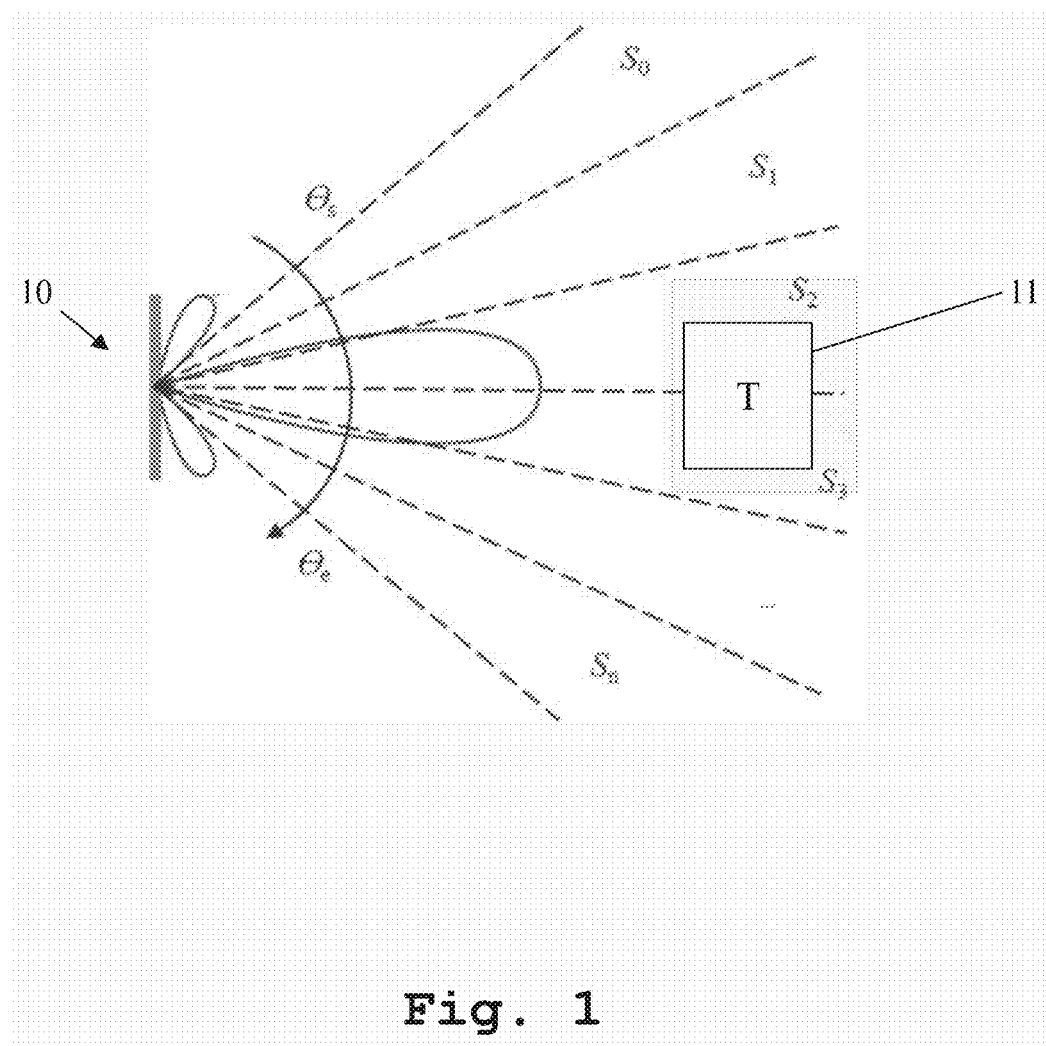
FIG. 1 illustrates the working principle of radar with a frequency scanning antenna, according to an example.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Generally, a radar (radio detection and ranging) uses electromagnetic waves to determine spatial information of objects, like range, angle, and velocity. These systems have been used in the past, mainly for space and defense applications. Due to the technological progress of recent years, radars are going to be used in the future in other applications like building automation, drones, HVAC (heating, ventilation, and air conditioning), smart home accessories such as smart speakers, etc. In these applications, the radars are used for continuous occupancy awareness, distance measurement, people tracking, and behavioral classification.

Radars have several advantages when compared to traditional sensors like cameras, ultra-sonic, and passive infrared sensors (PIR). In contrast to cameras, they better preserve privacy, and they are robust against varying ambient lighting conditions. Radar can detect smaller movements over a longer distance when compared to standard PIR. Therefore, the disadvantage of PIR can be overcome, based on people's micro motions (e.g., vital signs such as breathing and heart rate) as a radar can detect one or multiple still sitting people in a room. Vital sign detection can be used for the health monitoring of drivers and elderly people. By detecting tiny motions, emergencies like apnea, irregular heart rate, or sudden infant death can be identified. Radars can be used in a contactless manner; thus, no interaction with the people is needed.

For tracking, detection, and counting of people, a radar with a spatial (e.g., range and angle) and speed resolution are needed. In general, an angular resolution is achieved by a beam steering of the emitted or received electromagnetic signal. Therefore, different principles are known and used. One principle is the MIMO (multiple-input multiple-output) radar, where multiple transmitters are emitting signals via multiple antennas. These are reflected by an object and received by multiple antennas and their respective receivers. Algorithms do the beam steering in the digital post-processing. Another principle is the phased array antenna, which also uses multiple receive and transmit antennas. A complex radio frequency front-end, mainly based on phase shifters, is used. In this case, the beam steering is done electrically by phase-shifting the feeding lines of the antennas.

The previously mentioned principles are costly and power-consuming because multiple front ends and multiple antennas are required. In cost and power-sensitive applications, radars that use SISO (single-input single-output) become more interesting because the required number of components is minimized. The usage of just one transmitter and one receiver reduces the power consumption of the analog front-end and the required chip size.

Therefore, this principle creates the opportunity to deploy radars in a high amount and long-term battery powered for big scale applications. The potential disadvantage with the SISO radar is its ability for direction-finding. Most antennas have a fixed radiation pattern; thus, no spatial diversity can be provided. An alternative is physically rotating the antenna such that the main beam illuminates different angular sectors. Algorithms for super-resolution direction finding for such systems are available, but moving mechanical components are unappreciated due to its mechanical complexity and scanning speed.

In order to avoid these drawbacks, the disclosure employs a frequency scanning antenna (FSA), which can steer the beam direction electrically by varying the excitation frequency. In this context, it is noted that two antennas can be used, with a diplexer, whereas a reduction to one antenna is still possible and described within the scope of the disclosure.

With the aid of the disclosure, one can detect and track moving objects. For this reason, joint estimation algorithms for extracting range, angle, and Doppler (velocity) simultaneously are used. The disclosure addresses and can mitigate three difficulties, which are described in the following.

The first difficulty is the development of a signal processing framework for joint angle and range-velocity estimation. Radars have existed for almost one century. Therefore, a systematic way of implementing radar algorithms has been established. Typically, radar raw data are organized in multidimensional matrixes called a radar cube or a radar data cube. For this data format a wide variety of algorithms are already available. Accordingly, generating such a radar cube makes the teachings of the disclosure particularly useful because any further processing can be done with existing algorithms.

Thus, the second difficulty to overcome is the creation of a radar cube or a radar data cube in order to provide a generic interface for higher-level applications. Furthermore, the third difficulty to increase the angular and range resolution of a SISO radar with an FSA, for example achieved by the algorithm of the signal processing chain. This can be implemented with a SISO radar with an FSA and can be achieved through the usage of overlapping angular windows in the signal processing chain. Additionally or alternatively, another difficulty is to reduce the computational effort of the angular estimation through finding the (e.g., optimum) tradeoff between angular and range resolution of a SISO radar with a FSA, for example achieved with respect to the corresponding signal processing chain.

It is noted that adjustments may be useful for a signal processing chain implementation into dedicated hardware blocks of an SoC (system on chip), for instance, to unload a microprocessor and to accelerate the data execution.

Now, with respect to the figures, the working principle of a SISO radar with an FSA 10 is depicted in FIG. 1. The beam is rotating from the starting angle $\theta_s$ to the end angle $\theta_e$ and illuminating a target II such as a person. The complete angular coverage area is divided into n several angular sectors $S_0$-$S_n$.

A sawtooth FMCW (frequency modulated continuous wave) chirp with normalized power s(t) can be expressed as:

$$s(t) = \cos\left(2\pi f_c t + 2\pi \frac{\mu}{2} t^2\right), 0 < t < T_c, \quad (1)$$

wherein $f_c$ denotes the starting carrier frequency,
wherein $\mu$ denotes the frequency slope, and
wherein $T_c$ denotes the chirp duration.

Figure 2:
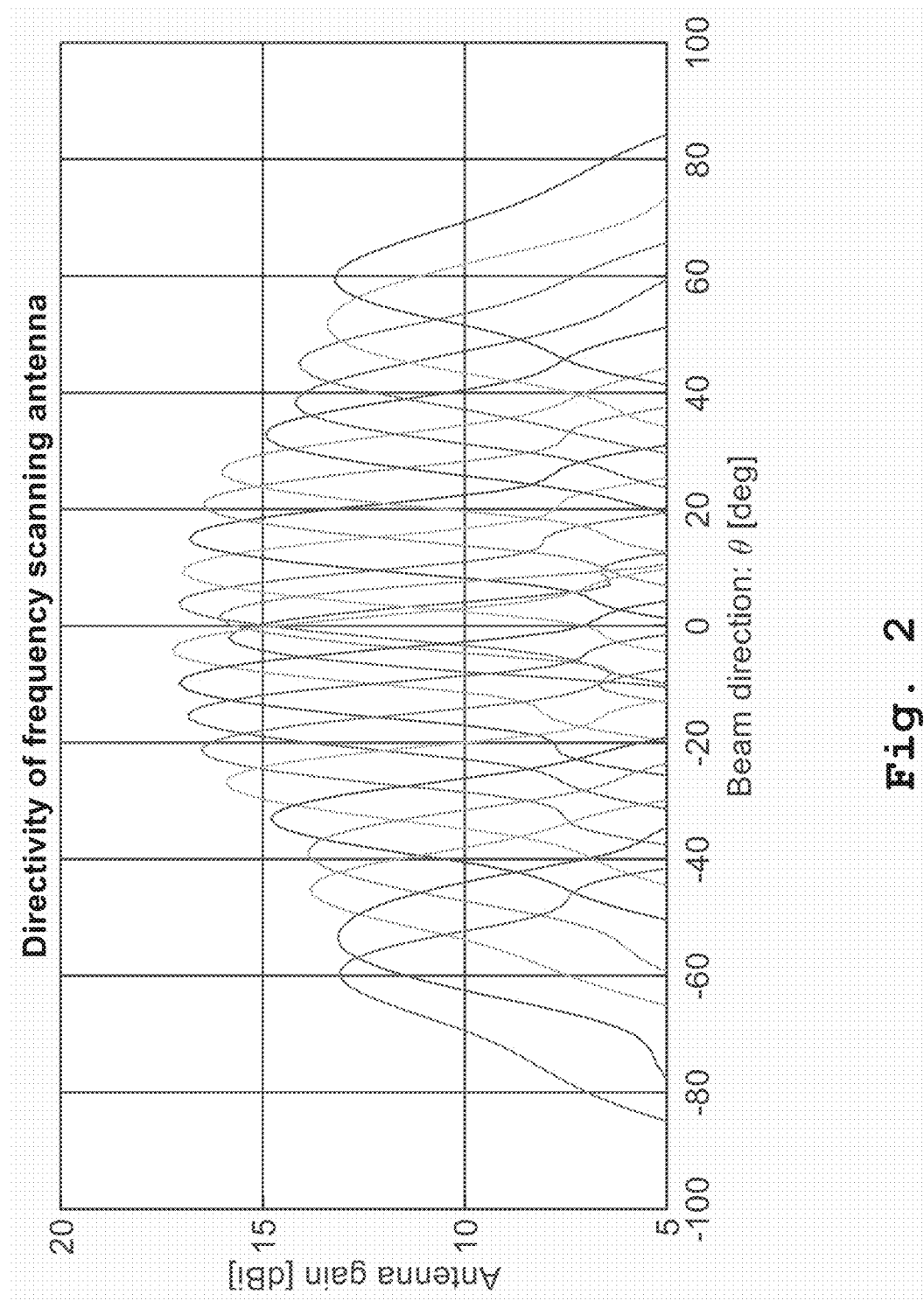
FIG. 2 shows a radiation pattern of a frequency scanning antenna as a function of both angle and frequency, according to an example.

The antenna radiation pattern of the FSA is modeled as a frequency-dependent function $A(\theta, f)$ and shown in FIG. 2. Frequency f is a linear function of time t:

$$f(t) = f_c + \mu t. \quad (2)$$

Thus, the radiation pattern effectively is a function of time, as $A(\theta, t)$. To establish the following equations, it is assumed that the targets are point targets, and there is no background reflection. Starting from a single target case, wherein the target is d meters away, moving at v m/s along the radial direction and at $\theta_t$ degrees, then the received signal is:

$$r(t) = a_L A^2(\theta_t, t)\cos(2\pi f_c(t-\tau) + \pi\mu(t-\tau)^2 + 2\pi f_d t). \quad (3)$$

In this context, $\alpha_L$ denotes the loss term including gains in processing chain and path loss, $\tau = 2d/c$ denotes the time delay due to the round trip, $f_d = 2v/\lambda$ denotes the Doppler frequency, and $\lambda$ denotes the wavelength. It is noted that the square is there for radiation pattern because we use the same antenna for transmission and reception. As a result, the amplitude of the received signal is maximized when the direction of the main beam at $f = f_c + \mu t$ is at an angle $\theta_t$.

Figure 3A:
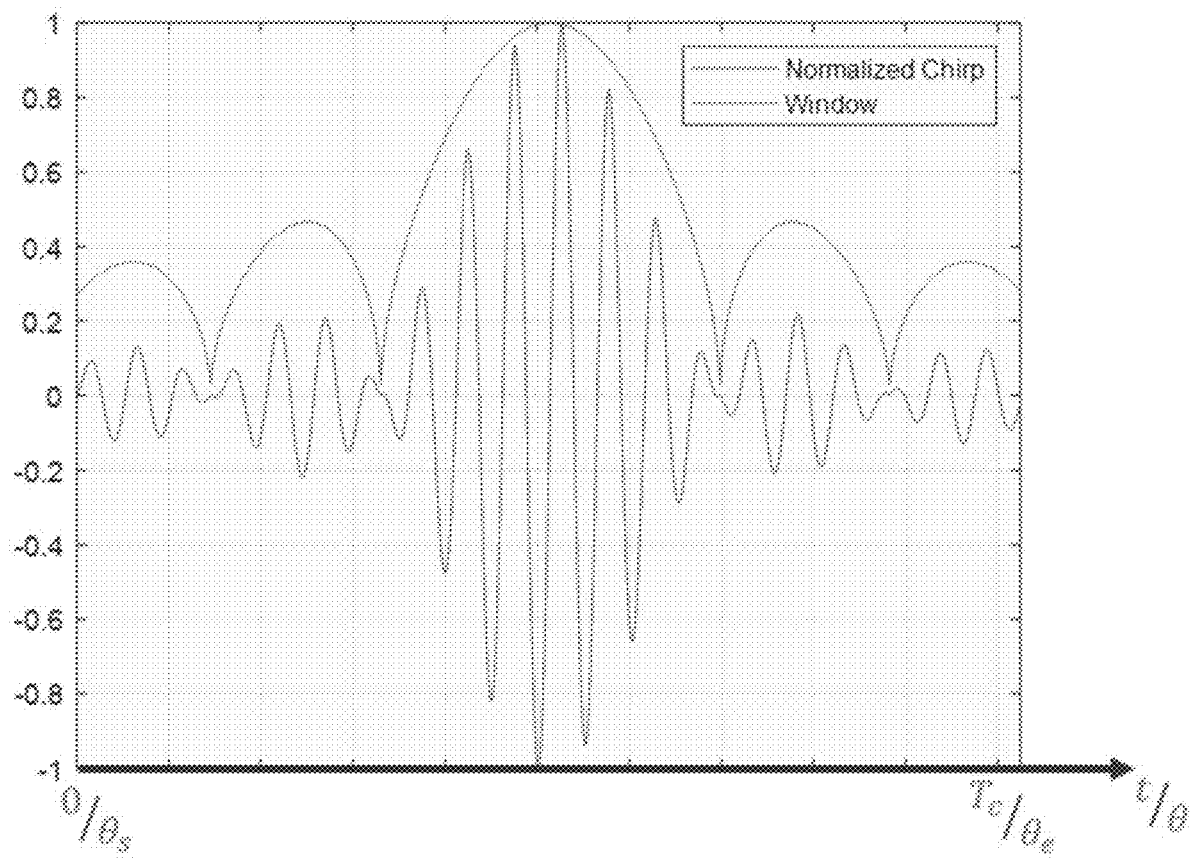
FIG. 3A depicts a normalized baseband signal with a single point target, wherein the respective window is centered at the target's angle of arrival, according to an example.

During the other periods in the chirp, the target is illuminated by side lobes, thus yielding low amplitude in the receiver. As a result, as the main beam of the FSA scans different angles, the variation of the respective received amplitude during a chirp may be seen. The scanned angle that corresponds to the maximum in the received amplitude may be the target's angle of arrival (AoA). The normalized chirp is shown in FIG. 3A.

It is noted that the transmitted signal does not have a uniform amplitude, because the antenna gain varies over frequency (see FIG. 2). But in practice, the amplitude variation in indoor environments may not be visible because background reflections are mainly dominant. The final received signal would be a superposition of multiple similar waveforms with different angles of arrival, phase, and magnitude. The objects in the background also give strong reflection back to the receiver. As a result, the raw amplitude of received chirps can generally not provide angular information.

However, velocity information should allow for separate moving targets and static environment. The portions of a chirp at the vicinity of angles at which targets are located comprise the targets' range and velocity information while the other portions typically do not.

Firstly, these portions of chirp that comprise targets' information are extracted by applying window functions. These window functions are called in the following angular windows, which also suppresses the frequency leakage of the FFT (Fast Fourier Transform).

It is noted that the choice (e.g., type or length) of the angular window is not limited to what is described below. As already illustrated by FIG. 1, the complete coverage area is divided into several angular sectors $S_0 \ldots S_n$, wherein each $S_n$ is associated to an angular window $W_n$. As a starting point, the following definition of $W_n$ is used; later in this document, variations thereof may be introduced.

The n-th angular window function $W_n$ is this defined by the radiation pattern of the respective FSA in the azimuth plane:

$$W_n(\theta) = A^2(\theta, t_n), \theta_s < \theta < \theta_e, \quad (4)$$

wherein $\theta_s$ and $\theta_e$ are the starting and ending angles scanned by the FSA. At $t_n$ which corresponds to the instantaneous carrier frequency $f_n$, the antenna pattern is steered at an angle $\theta_n$. The window is scaled proportionally to fit between $\theta_s$ and $\theta_e$. For the simulation results in FIG. 3A or FIG. 3B a point target is considered, and only in FIG. 3A the window is centered at the AoA of the respective target. After windowing, the portion that comprises the target information is preserved.

Figure 3B:
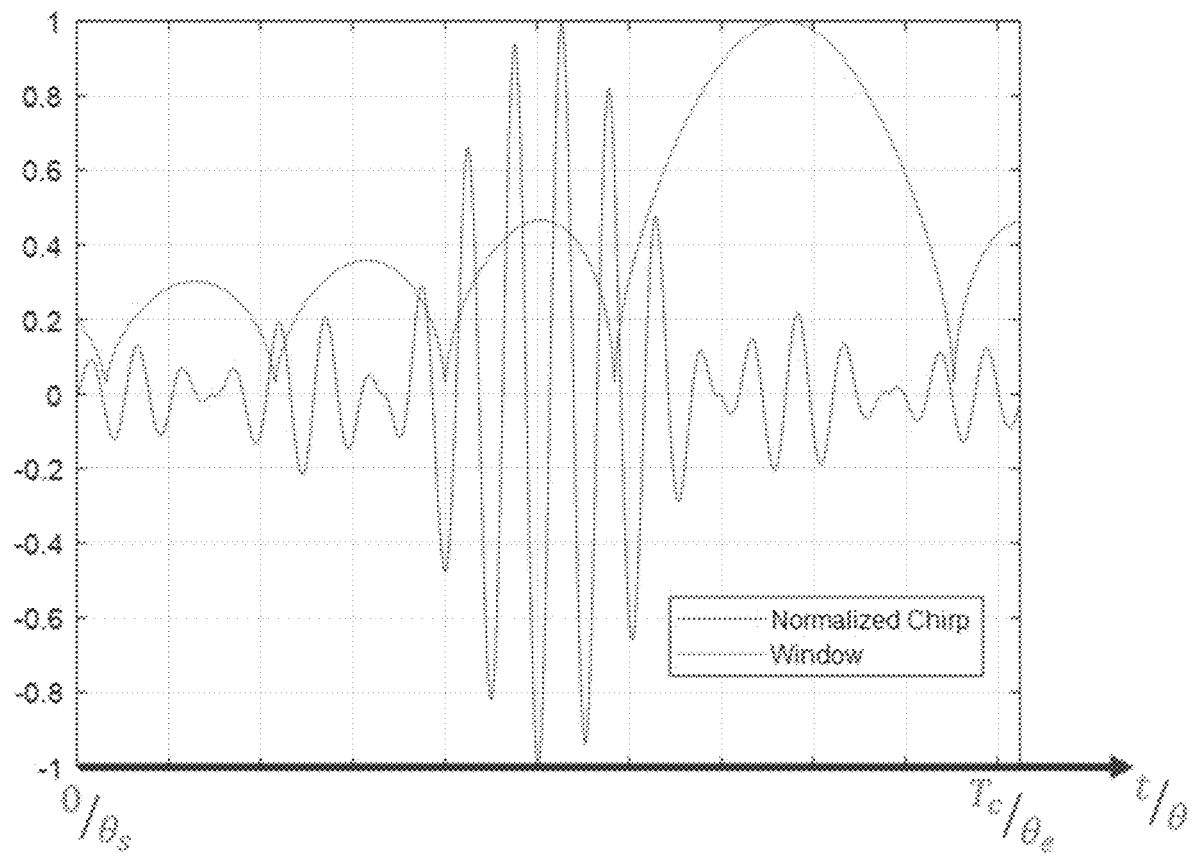
FIG. 3B illustrates a normalized baseband signal with a single point target, wherein the respective window is centered at another angular sector than the target's angle of arrival, according to an example.

If the angular window $W_i$ of the corresponding angular sector $S_i$ is applied on a target, which is in another angular sector $S_j$, the target will be suppressed, as depicted in FIG. 3B. The range-Doppler processing of two cases will exhibit different magnitudes. The angular window that matches the actual AoA will yield the strongest range-Doppler magnitude.

Figure 4A:
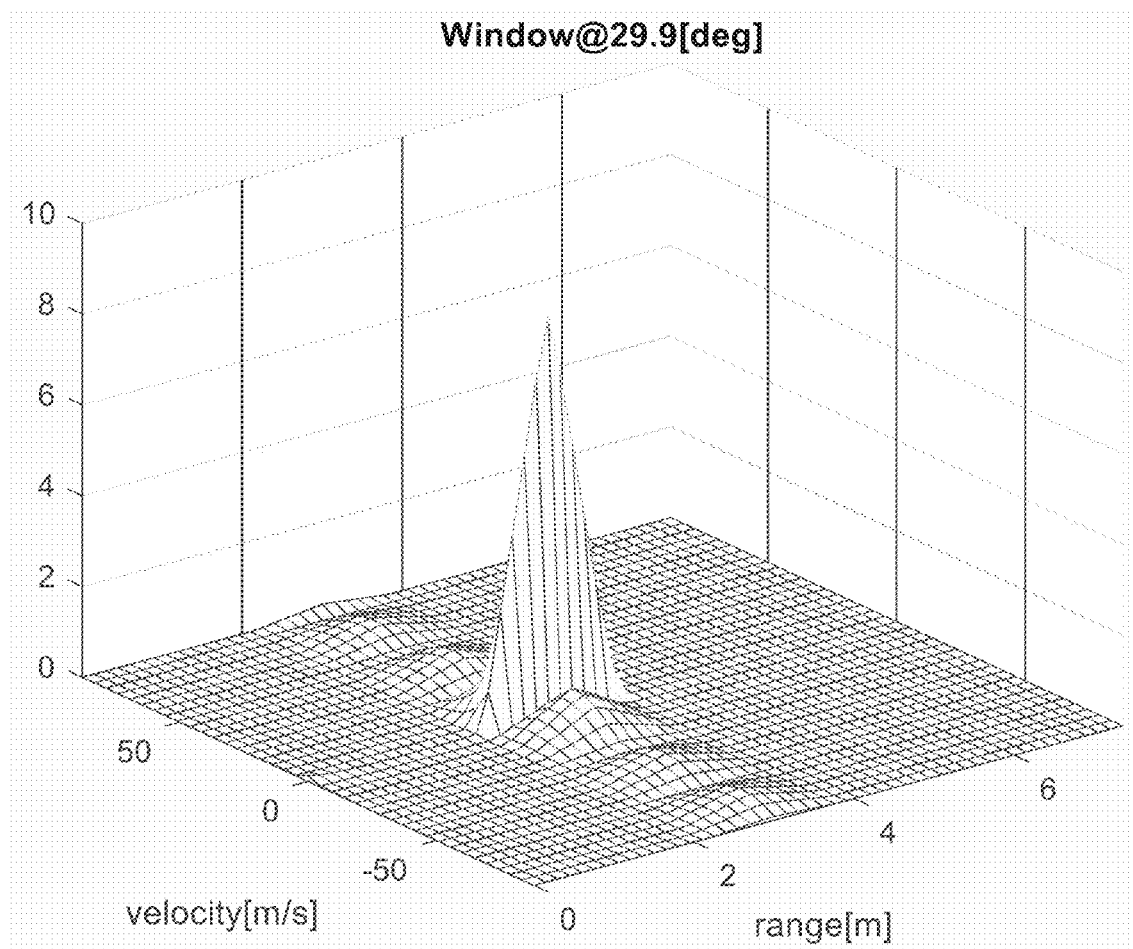
FIG. 4A shows a range-Doppler profile (2D-FFT) after windowing with respect to FIG. 3A, according to an example.
Figure 4B:
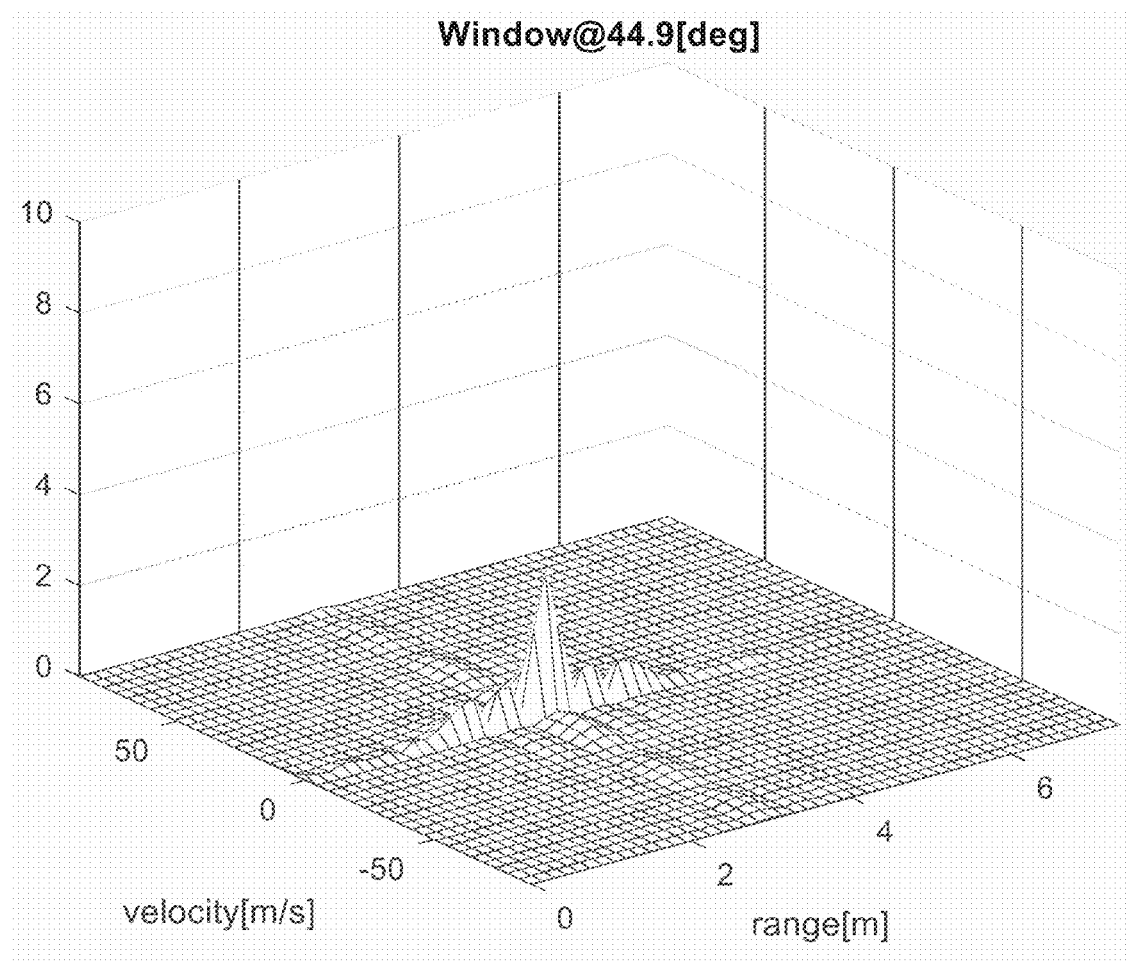
FIG. 4B shows a range-Doppler profile (2D-FFT) after windowing with respect to FIG. 3B, according to an example.

Furthermore, FIG. 4A and FIG. 4B show the respective range-Doppler profile after applying the angular windows in FIG. 3A or FIG. 3B, respectively. Applying a selection of N angular windows that are centered at discrete different angles gives N copies of the time domain signal with different portions of a chirp extracted.

The height of the range-Doppler peak corresponding to the target varies according to the alignment between the angular window center angle and the target's AoA. If the respective vector is extracted from the radar cube that corresponds to the target's range-Doppler bin, a variation as a function of angle may be seen.

Figure 5:
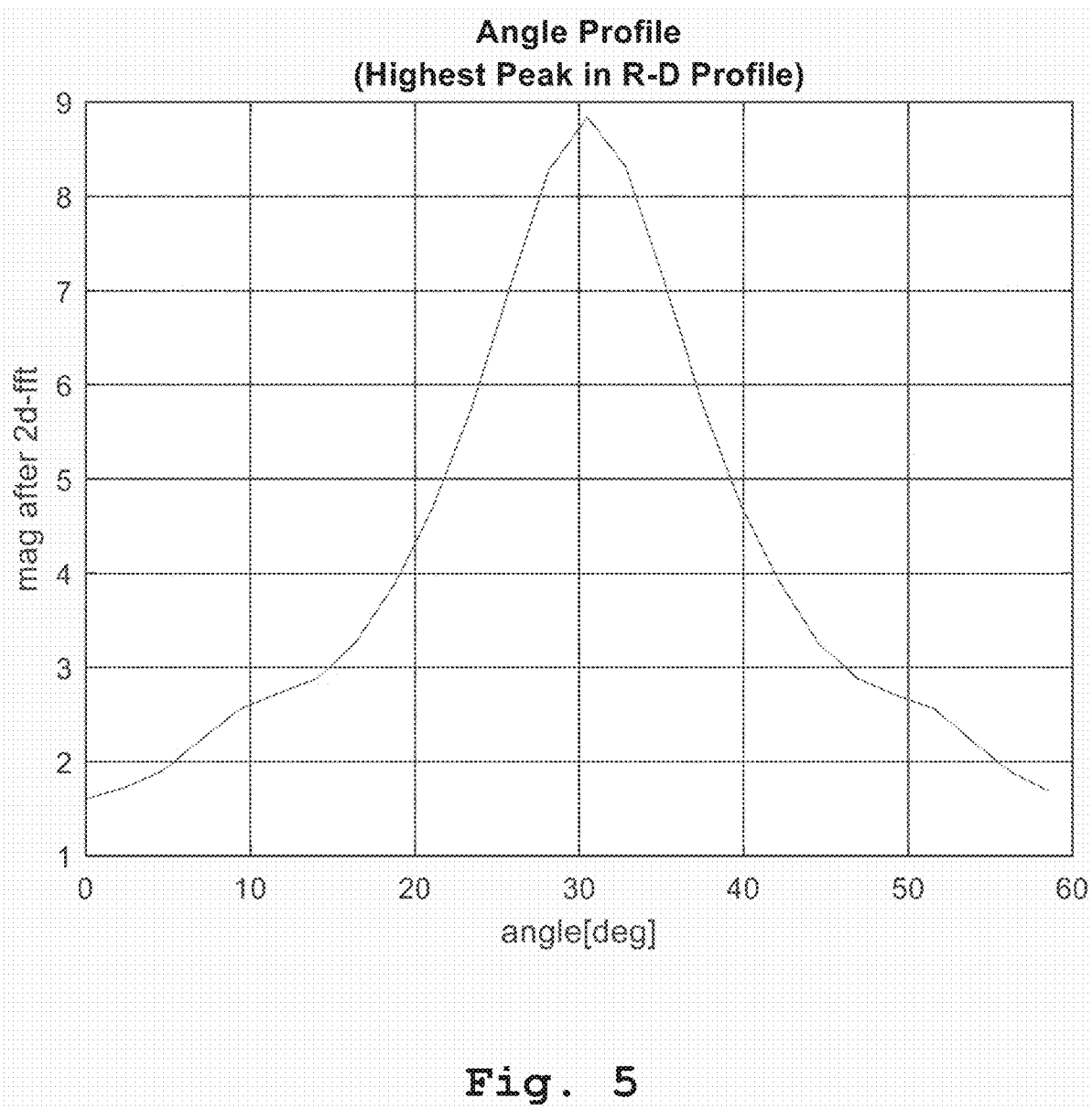
FIG. 5 depicts an angle profile in the range-Doppler domain, according to an example.

This variation is called angle profile. The angle profile of the example shown above is illustrated by FIG. 5, wherein the windows are separated by about 2.5 deg from each other. A clear peak is observed at 30 deg, which is exactly the target's AoA.

As already discussed above, there are three major difficulties. One of these difficulties comprises establishing a signal processing chain of the SISO radar with an FSA.

Figure 6:
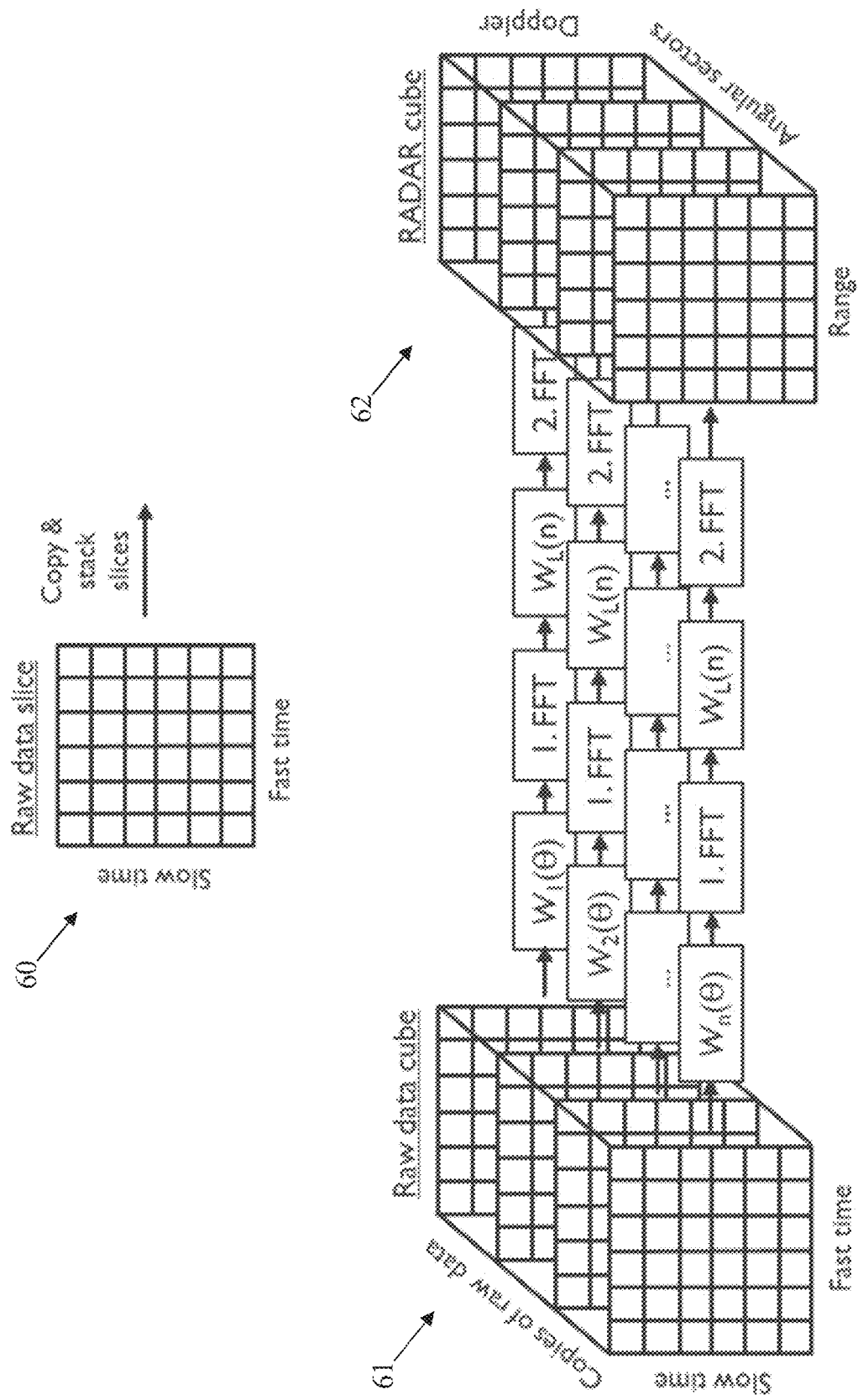
FIG. 6 illustrates a block diagram of a signal processing chain for generating a radar data cube, according to an example.

In accordance with FIG. 6, a signal processing chain for generating the radar cube is depicted. On the top of FIG. 6, there are the raw data arranged in a two-dimensional matrix 60, which represents a coherent processing interval.

This slice 60 is copied n times into the three-dimensional raw data cube 61. After this step, the angular windows $W_n(\theta)$, the range (1.) FFTs, the frequency leakage windows $W_L(n)$ and the Doppler (2.) FFTs are applied on every slice.

Generally, as an alternative thereto, it might be useful if with respect to the raw data slice, at least one of a window function, for example an angular window function, a first frequency transform, for example a frequency transform regarding range, a leakage window function, for example a frequency leakage window function, a second frequency transform, for example a frequency transform regarding Doppler, or any combination thereof is applied.

Another of the above-mentioned major three difficulties comprise creating the radar cube 62 or radar data cube. Especially due to the generation of the raw data cube 61 and applying the above-mentioned steps on every slice, the result is by its own nature a radar cube such as the radar cube 62 with range, Doppler, and angular sector. The difference is that for a MIMO radar, the third dimension may represent antenna elements that are separated in space.

It is further noted that the radar cube generation described above can be enhanced for implementation in the digital hardware of an SoC. In this context, the first step, copying the raw data slice and creating a raw data cube, can be skipped; the radar cube can be directly calculated based on the raw data slice. For the sake of completeness, it is noted that the raw data cube could require more memory. Thus, more physical space on the silicon of an SoC and more energy may be needed. Furthermore, the data copying process may require more energy.

In the following, a method is described for deriving angular windows from the radiation pattern of the FSA. In this context, it is noted that there may be a tradeoff between angular resolution and range resolution. The general cause of the major three difficulties may be that narrow angular windows are resulting in a lower effective bandwidth BW of the FMCW chirp, which is analyzed by the signal processing chain.

Therefore, the target will be virtually illuminated by less BW and the range resolution dres increases and is coarser. With the speed of light c=299792458 m/s, the range resolution can be calculated as.

$$dres = \frac{c}{2B}. \qquad (5)$$

Figure 7:
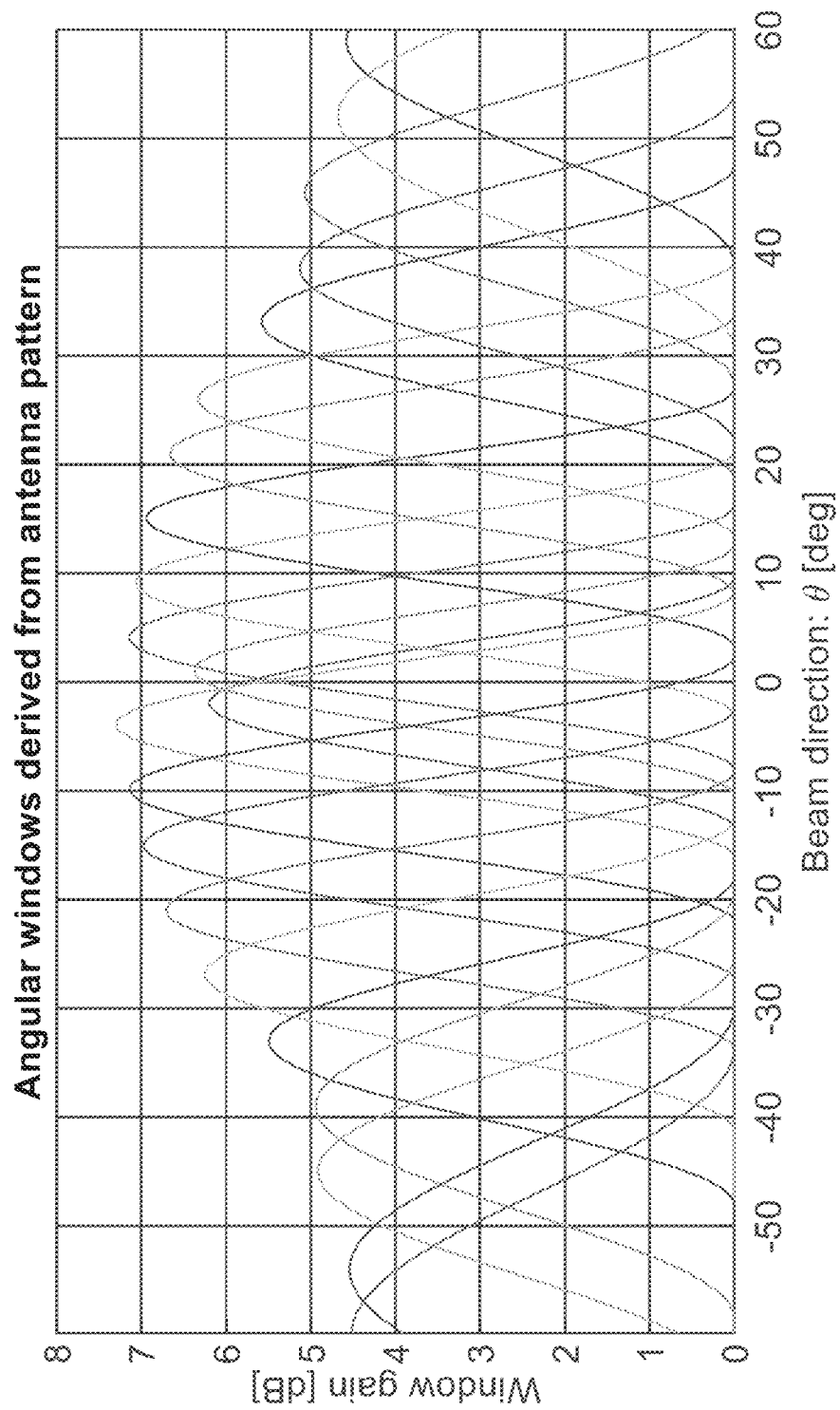
FIG. 7 shows angular windows derived from the respective antenna pattern, according to an example.

For increasing the angular and range resolution at the same time in order to address the above-mentioned difficulty, overlapping instead of into exact areas dividing windows should be used. The angular windows are in an overlapping manner as illustrated by FIG. 7.

The method having multiple implementation benefits comprises at least one of the following steps.

The method may comprise the step of defining the required number n of angular sectors $S_n$ (see FIG. 1).

In this context, it is noted that it might be beneficial if the minimum requirement for the number n of angular sector is:

$$n = \theta_{FSA}/\theta_{HPBW}, \qquad (6)$$

wherein $\theta_{FSA}$ denotes the respective angular coverage range of the FSA (see FIG. 2; −60 deg to 60 deg), and wherein $\theta_{HPBW}$ denotes the beam width of the FSA at θ=0 deg (see FIG. 2; similar to the middle antenna patterns). In this context, it is noted that $\theta_{HPBW}$ may be the 3 dB-, 5 dB-, or another beam width.

In addition to this, a requirement for n, to avoid degradation in angular resolution, may be:

$$n \geq 2 \cdot \theta_{FSA}/\theta_{HPBW}. \qquad (7)$$

It is further noted that it might be beneficial if the number of angular sectors is equal to the number angular windows. Furthermore, the method may comprise the step of retrieving the FSA radiation pattern $A(\theta_m, t_n)$ based on the mid-angles $\theta_m$ of each $S_n$.

Moreover, the method may comprise the step of creating a new angular window function based on standard window functions (for instance, a Hann window, a Hamming window, etc., or a combination thereof) and aligning it with the FSA radiation pattern $A(\theta_m, t_n)$ in position $(\theta_m, t_n)$, beam width $\theta_{HPBW}$ and height $(\hat{A}(\theta_m, t_n))$. Generally, as an alternative, it is noted that it might be beneficial if the alignment is done on the basis of at least one of the foregoing list or any combination thereof.

Furthermore, examples of angular windows are depicted in FIG. 7. These are derived from the antenna pattern of FIG. 2. In this context, a 3 dB beam width has been chosen for the alignment.

For the first step of the above-mentioned method, the following tradeoffs may be important, when the number n of angular windows $W_n$ or sectors $S_n$ will be defined. Typically, the more angular windows are defined, the higher the computational effort for the signal processing chain will be.

In the second step of the above-mentioned method, the radiation patterns $A(\theta_m, t_n)$ of the FSA should be generated. Based on the number n of the angular sectors $S_n$ and the complete angular coverage area ($\theta_s$ to $\theta_e$, see FIG. 1), the mid-angles $\theta_m$ of each $S_n$ are defined. With $\theta_m$, the radiation patterns $A(\theta_m, t_n)$ of the FSA are generated via an antenna simulation.

In the third step, as angular windows $W_n(\theta)$, there may be used window functions like Hann, Hamming, Blackman Harris, etc., or any combination thereof. This may have the benefit of having full control over the frequency leakage instead of just using the antenna pattern $A(\theta_m, t_n)$.

Therefore, the angular windows should be aligned in position $\hat{W}_n(\theta) = \hat{A}(\theta_m, t_n)$ and in beam width $W_n(\theta_{HPBW}) = A(\theta_{HPBW}, t_n)$. The alignment at the 3 dB-, 5 dB-, or another beam width determines the width of the resulting angular window and thus the amount of overlapping between the angular windows.

Figure 8:
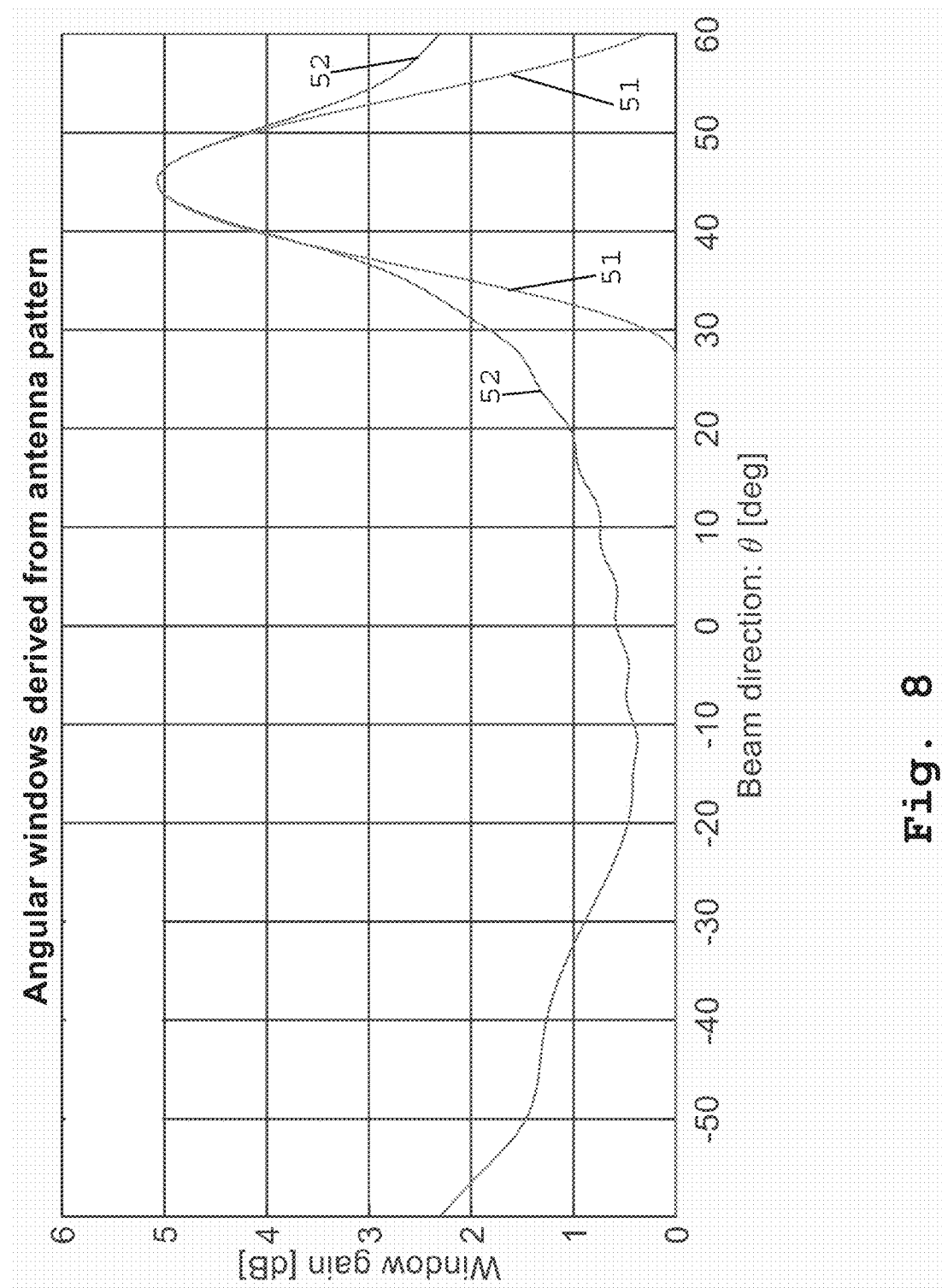
FIG. 8 shows an angular window overlaid with the respective appropriate antenna pattern, according to an example.

A corresponding example is illustrated by FIG. 8 showing one angular window 51 overlaid with the appropriate antenna pattern 52. In this context, the antenna pattern derives an angular window at the 45 Deg beam direction. Therefore, the 3 dB beam width is chosen.

In the following, a signal processing method into an SoC is described. In this context, it is noted that the approach with angular windows has multiple potential benefits. In general, a lot of unused data can be discarded. This reduces the total number of mathematical operations, which saves production costs for the implementation of less digital calculation and memory blocks. Furthermore, less mathematical operations are consuming less energy.

In the present example, the complete angular range (−60 deg≥θ≥60 deg) is internally sampled in the radar by an ADC (analog-to-digital converter) and converted in a 1024 element long data vector. After this raw data is multiplied with an angular window (see FIG. 8), about 75% of the resulting data is filled with zeros. This result can be treated as a zero-padded signal. The number of frequency bins increases but not the range resolution. Therefore, the zeros can be removed, and the number of mathematical operations can be reduced.

The SISO radar with FSA and the introduced signal processing method can create a low cost and low power principle, which provides range, angle, and Doppler information. The SISO RADAR, as well as the FSA, has in comparison to MIMO and phased array antenna principles low complexity and thus less components.

It is further noted the disclosure may be used for or in the context of smart home, smart building, health, HVAC (heating, ventilation, and air conditioning), drone applications, or any combination thereof. With respect to smart home applications, it is noted that the disclosure may be used in a smart assistant for people classification.

With respect to smart building applications, a control based on occupancy detection may exemplarily be realized with the aid of the disclosure. In addition to this or as an alternative, a dynamic employee guidance for flexible workspaces can be realized. Health applications, driver monitoring, and/or elderly people surveillance can be realized with the aid of the disclosure.

With respect to HVAC applications, the disclosure can be used on smart demand control, for instance, based on occupancy detection of meeting rooms or the like.

With respect to drone applications, a remote navigation for guided landing can be realized with the aid of the disclosure.

Figure 9:
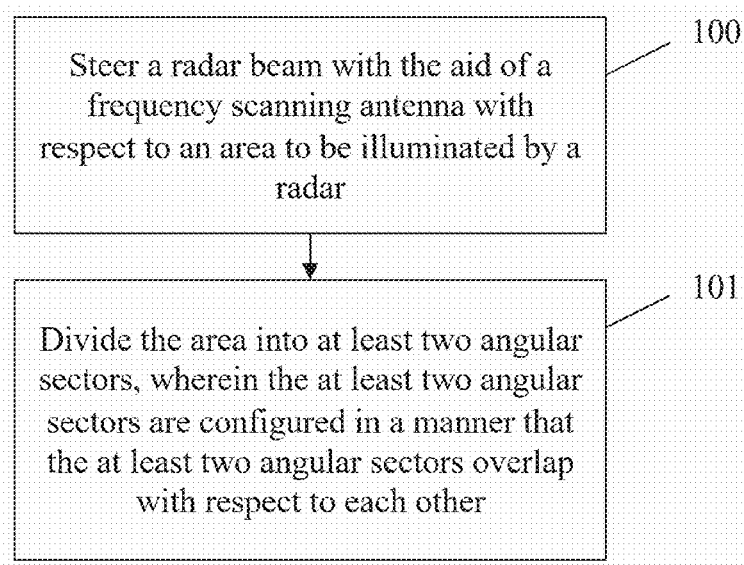
FIG. 9 shows a flow chart of an embodiment of the first aspect of the disclosure, according to an example.

Now, with respect to FIG. 9, a flow chart of an embodiment of the method for extracting spatial resolution and/or velocity resolution of a SISO radar acquiring raw radar data with a frequency scanning antenna is shown. In a first step 100, a radar beam is steered with the aid of the frequency scanning antenna with respect to an area to be illuminated by the radar. Then, in a second step 101, the area is divided into at least two angular sectors. In this context, the at least two angular sectors are configured in a manner that the at least two angular sectors overlap each other.

It might be beneficial if for steering the radar beam with the aid of the frequency scanning antenna, the method comprises the step of varying the respective excitation frequency. It is further noted that the method may comprise the step of generating a raw data slice comprising the raw radar data on the basis of the at least two angular sectors.

It is noted that the raw data slice may comprise or be a two-dimensional matrix. In addition to this or as an alternative, the raw data slice may represent a respective coherent processing interval. Further additionally or further alternatively, the raw data slice may comprise or be a slow-time and fast-time matrix.

Furthermore, the method may comprise the step of generating a raw data cube on the basis of the raw data slice by copying the raw data slice at least once and stacking the raw data slice and the at least one copy thereof together in order to form the raw data cube.

Moreover, it might be beneficial if the method comprises the step of generating a radar data cube on the basis of the raw data slice or the raw data cube by applying at least one window function and/or at least one frequency transform, for example at least one Fast Fourier Transform, to the raw data slice or the raw data cube.

Additionally or alternatively, the method may comprise the step of applying at least one angular window function to at least one, for example each, of the at least two angular sectors such that the corresponding angular window function matching the respective angle of arrival of a corresponding radar target yields the strongest respective magnitude in the raw radar data. In this context, it might be beneficial if the method comprises the step of deriving the at least one angular window function from the corresponding radiation pattern of the frequency scanning antenna.

Figure 10:
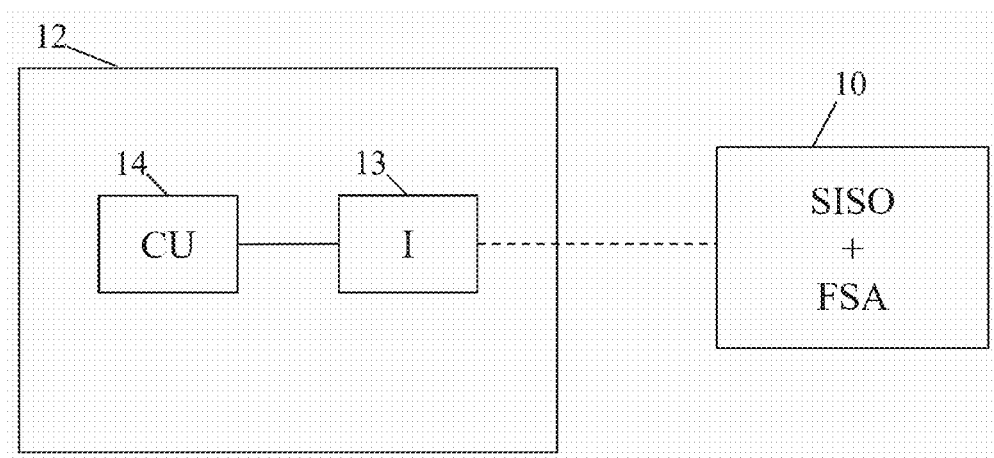
FIG. 10 shows an embodiment of a device, according to an example.

Finally, FIG. 10 shows a block diagram of a device 12 for extracting spatial resolution and/or velocity resolution of a SISO radar acquiring raw radar data with a frequency scanning antenna 10.

According to FIG. 10, the device 12 comprises an interface 13 being connectable to the SISO radar with the frequency scanning antenna 10, and a control unit 14 connected to the interface 13.

In this context, the control unit 14 is configured to steer a radar beam with the aid of the frequency scanning antenna with respect to an area to be illuminated by the radar. Furthermore, the control unit 14 is configured to divide the area into at least two angular sectors. In addition to this, the at least two angular sectors are configured in a manner that the at least two angular sectors overlap with respect to each other.

It is noted that it might be beneficial if for steering the radar beam with the aid of the frequency scanning antenna, the control unit 14 is configured to vary the respective excitation frequency. It is further noted that the control unit 14 may be configured to generate a raw data slice comprising the raw radar data on the basis of the at least two angular sectors.

With respect to the raw data slice, it is noted that the raw data slice may comprise or be a two-dimensional matrix. Additionally or alternatively, the raw data slice may represent a respective coherent processing interval. In further addition to this or as a further alternative, the raw data slice may comprise or be a slow-time and fast-time matrix. Furthermore, the control unit 14 may additionally or alternatively be configured to generate a raw data cube on the basis of the raw data slice by copying the raw data slice at least once and stacking the raw data slice and the at least one copy thereof together in order to form the raw data cube.

Moreover, it might be beneficial if the control unit 14 is configured to generate a radar data cube on the basis of the raw data slice or the raw data cube by applying at least one window function and/or at least one frequency transform, for example at least one Fast Fourier Transform, to the raw data slice or the raw data cube.

In addition to this or as an alternative, the control unit 14 may be configured to apply at least one angular window function to at least one, for example each, of the at least two angular sectors such that the corresponding angular window function matching the respective angle of arrival of a corresponding radar target yields the strongest respective magnitude in the raw radar data. In this context, it might be beneficial if the control unit 14 is configured to derive the at least one angular window function from the corresponding radiation pattern of the frequency scanning antenna.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method comprising:
   steering, via a frequency scanning antenna (FSA), a radar beam over an angular range;
   detecting a return signal; and
   generating a first windowed return signal by applying a first angular window function to the return signal, wherein the first angular window function corresponds to a first angular sector of the angular range; and
   generating a second windowed return signal by applying a second angular window function to the return signal, wherein the second angular window function corresponds to a second angular sector of the angular range that overlaps with the first angular sector, wherein the method comprises:
   generating windowed return signals by applying angular window functions to the return signal, wherein the angular window functions correspond to a quantity of angular sectors of the angular range, wherein the windowed return signals comprises the first windowed return signal and the second windowed return signal and the angular window functions comprise the first angular window function and the second angular window function, wherein the quantity of the angular sectors of the angular range is (1) greater than two times an angular coverage range of the FSA divided by a half power beam width of the FSA or (2) is equal to the angular coverage range of the FSA divided by the half power beam width of the FSA.

2. The method according to claim 1, wherein steering the radar beam over the angular range comprises varying an oscillation frequency of an input to an antenna.

3. The method according to claim 1, wherein detecting the return signal comprises generating a data slice that includes data associated with the first angular sector and the second angular sector.

4. The method according to claim 3, wherein the data slice comprises a two-dimensional matrix.

5. The method according to claim 3, wherein the data slice represents a coherent processing interval.

6. The method according to claim 3, wherein the data slice comprises a slow-time and fast-time matrix.

7. The method according to claim 3, wherein generating the first windowed return signal comprises applying a frequency transform to the return signal.

8. The method according to claim 1, wherein generating the first windowed return signal comprises attenuating a portion of the return signal outside of the first angular sector.

9. The method according to claim 1, further comprising:
   emitting the radar beam from an antenna; and
   generating the first angular window function based on a first radiation pattern of the antenna within the first angular sector.

10. The method according to claim 9, further comprising generating the second angular window function based on a second radiation pattern of the antenna within the second angular sector.

11. A device comprising:
    an interface being connectable to a single input single output (SISO) radar having a frequency scanning antenna (FSA); and
    a control unit connected to the interface, the control unit configured to cause the SISO to perform functions comprising:
      steering a radar beam over an angular range;
      detecting a return signal; and
      generating a first windowed return signal by applying a first angular window function to the return signal, wherein the first angular window function corresponds to a first angular sector of the angular range; and
      generating a second windowed return signal by applying a second angular window function to the return signal, wherein the second angular window function corresponds to a second angular sector of the angular range that overlaps with the first angular sector,
    wherein the functions comprise:
    generating windowed return signals by applying angular window functions to the return signal, wherein the angular window functions correspond to a quantity of angular sectors of the angular range, wherein the windowed return signals comprises the first windowed return signal and the second windowed return signal and the angular window functions comprise the first angular window function and the second angular window function, wherein the quantity of the angular sectors of the angular range is (1) greater than two times an angular coverage range of the FSA divided by a half power beam width of the FSA or (2) is equal to the angular coverage range of the FSA divided by the half power beam width of the FSA.

12. The device according to claim 11, wherein steering the radar beam over the angular range comprises varying an oscillation frequency of an input to the FSA.

13. The device according to claim 11, wherein detecting the return signal comprises generating a data slice that includes data associated with the first angular sector and the second angular sector.

14. The device according to claim 13, wherein the data slice comprises a two-dimensional matrix.

15. The device according to claim 13, wherein the data slice represents a coherent processing interval.

16. The device according to claim 13, wherein the data slice comprises a slow-time and fast-time matrix.

17. The device according to claim 13, wherein generating the first windowed return signal comprises applying a frequency transform to the return signal.

18. The device according to claim 11, wherein generating the first windowed return signal comprises attenuating a portion of the return signal outside of the first angular sector.

* * * * *